Feb. 27, 1968 F. E. FLORES 3,370,454
CONSTANT TEMPERATURE BATH FOR CALIBRATING
IMMERSION TYPE INSTRUMENTS
Filed Nov. 24, 1965 2 Sheets-Sheet 1
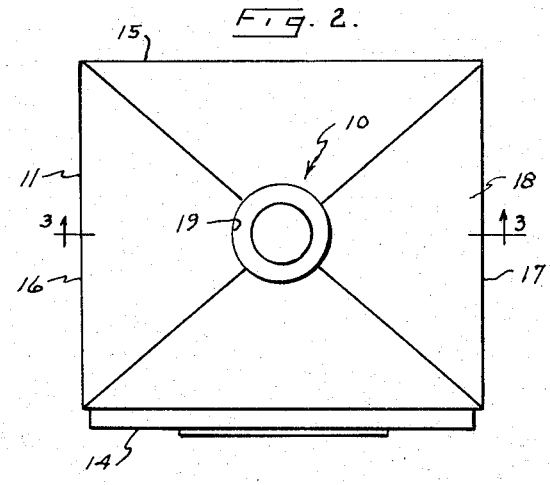
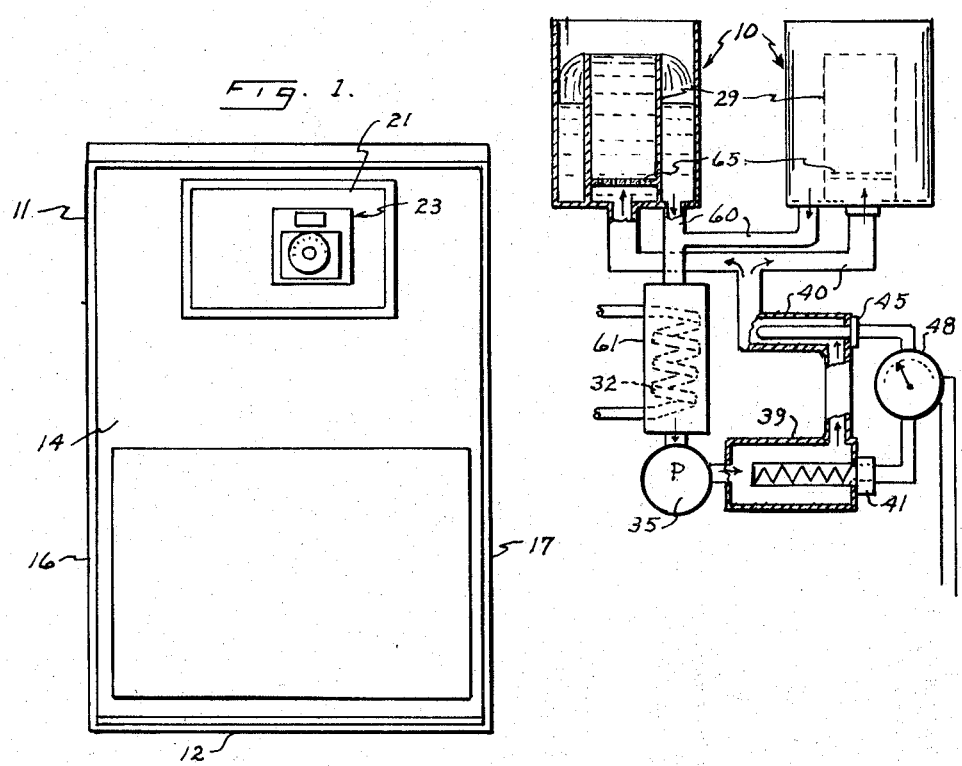
INVENTOR.
FERNANDO E. FLORES
BY
AGENT

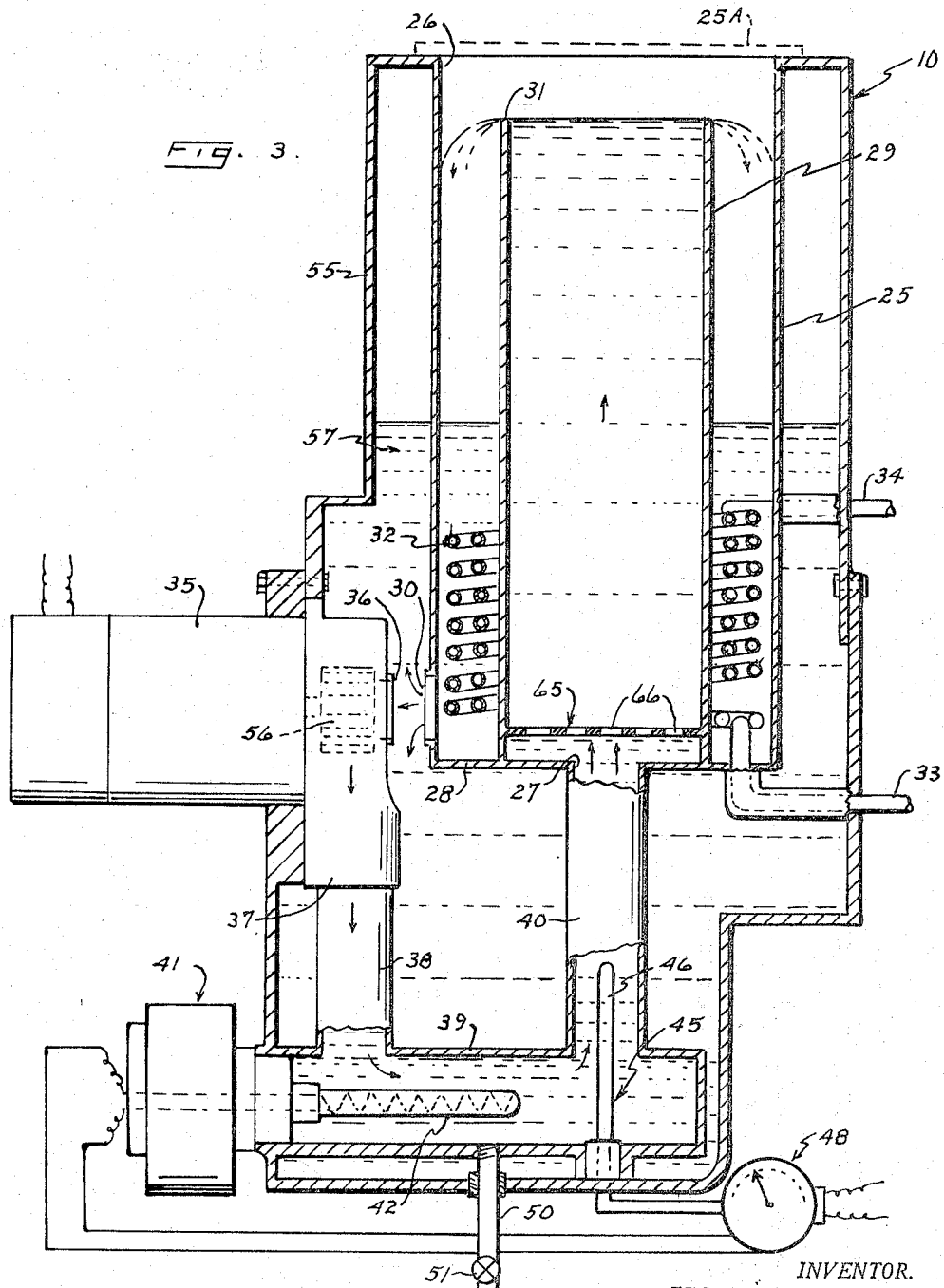

\# United States Patent Office 3,370,454
Patented Feb. 27, 1968

3,370,454
CONSTANT TEMPERATURE BATH FOR CALIBRATING IMMERSION TYPE INSTRUMENTS
Fernando E. Flores, Parlin, N.J., assignor to Tenney Engineering, Inc., Union, N.J.
Filed Nov. 24, 1965, Ser. No. 509,557
6 Claims. (Cl. 73—1)

ABSTRACT OF THE DISCLOSURE

A constant temperature bath for testing and calibration of thermal responsive instruments in which one or more open top tanks or reservoirs are provided using a single open flow system to maintain a constant predetermined temperature in each tank or reservoir and means are provided to vary the fluid flow in one tank from that in another.

This invention relates to a constant temperature bath that is utilized for the testing and calibration of thermal responsive instruments, devices and materials that may be immersed and more particularly to an immersion bath that may be maintained at a very exact uniform temperature during any testing or calibration.

In the prior art there are constant temperature baths illustrated such as Patent No. 2,227,938 in which the immersion fluid from the bath is circulated through heat exchange coils to maintain a desired temperature and such as illustrated in Patent No. 2,299,867 in which air is circulated from the test chamber through heating elements and back to the test chamber. Or as illustrated in Patent No. 2,437,332 in which a liquid surrounds the test chamber and the liquid temperature is reduced by depositing carbon dioxide in the form of Dry Ice in the liquid and controlling the pressure within the surrounding chamber to maintain a desired low temperature. This is a low temperature refrigeration system. Or as illustrated in Patent No. 2,526,713 in which a test chamber is surrounded by a refrigerant coil and a liquid is provided in said test chamber for testing refrigeration controls. Or as in Patent No. 2,535,083 in which a plurality of tubes with a liquid such as oil are utilized as the containers for calibrating and each container is surrounded by a heating element and all containers are connected to an electric pyrometer.

It is an object of this invention to provide a constant temperature immersion bath for the testing and calibration of thermal responsive instruments, devices and materials in which the bath is filled with a fluid.

A further object of this invention is to provide a constant temperature immersion bath having an open flow system for the testing and calibration of thermal responsive instruments, devices and materials in which the system is filled with a fluid.

It is a still further object of this invention to provide a constant temperature constant level, open flow bath for the immersion of thermal responsive instruments, devices and materials to calibrate or test.

It is a further object of this invention to provide a constant temperature bath for the testing and calibration of thermal responsive instruments, devices and materials that may be immersed in air or powder as a dry system.

It is a further object of this invention to provide a constant temperature bath for the testing and calibration of thermal responsive instruments, devices and materials that may be immersed in a fluid or liquid and aggregate as a wet system.

A still further object of this invention is to provide a constant temperature constant level, open flow bath for the testing and calibration of thermal responsive instruments, devices and materials that may be immersed in said bath and in which the flow or circulation of said system promotes and entraps the return of vapor to minimize evaporation in the system.

A further object of this invention is to provide a tank like container mounted within a second tank like container to retain a fluid at a constant temperature, in which there is provided a refrigerant cooling means in said second tank and an enclosed forced circulating system connected thereto and a heater in said system that is thermostatically controlled by the temperature of the system and in which the configuration of said two tanks maintains a constant fluid level for an open flow constant temperature immersion bath for calibrating and/or testing thermal responsive instruments, devices and materials.

It is a further object of this invention to provide a constant temperature, constant level open flow bath for the and materials in which the condensation of moisture from the air is minimized to maintain a frost and ice free fluid in said system when the bath temperature is at or below the dew point temperature of the surrounding air.

It is a further object of this invention to provide a constant temperature, constant level open flow fluid bath for the immersion of thermal responsive instruments, devices and materials in which the bath is designed as a first container mounted within a second container and in which the first container is shorter than said second container to allow a continuous umbrella shaped spillage from said first container into said second container and a constant forced circulation of the spillage back through said first container.

It is a further object of this invention to provide a constant temperature, constant level open flow liquid bath for the immersion of thermal responsive instruments, devices and materials in which there is a minimum temperature gradient between the top and bottom of said liquid in said tank.

It is a further object of this invention to provide a constant temperature, constant level, open flow fluid bath for the immersion of thermal responsive instruments, devices and materials in which there is a fluid envelope about said bath to maintain a minimum temperature gradient.

It is a further object of this invention to provide a constant temperature, constant level, open flow fluid bath for the immersion of thermal responsive instruments, devices and materials in which there is a distribution plate at the inlet port of said bath to create a uniform flow of fluid through said bath.

It is a still further object of this invention to provide a constant temperature, constant level, open flow system including a plurality of baths for the immersion of thermal responsive instruments, devices and materials in which there is a distribution plate at the inlet port of each bath to create a uniform flow of fluid through each bath.

It is a further object of this invention to provide a constant temperature, constant level, open flow fluid bath for the immersion of thermal responsive instruments, devices and materials in which there is a distribution plate that can be adjusted or adjustable and is inserted at the inlet port of said bath to permit a minimum to maximum flow of said fluid through said bath.

Other objects of this invention shall be apparent by reference to the accompanying detailed description and the drawings in which:

FIG. 1 is a front elevational view of the device,
FIG. 2 is a plan view,
FIG. 3 is a cross sectional view taken on line 3—3 of FIG. 2, and
FIG. 4 is a schematic of a further embodiment.

Referring to the drawings and particularly FIGS. 1 and 2, there is illustrated a constant temperature bath 10 mounted in a housing 11. Housing 11 encloses the components provided to maintain the constant temperature bath 10 at a desired temperature and to maintain a continuous circulation of the fluid in the bath 10. Housing 11 is comprised of a base 12, a front and back 14 and 15, two sides 16 and 17 and a top 18. The top 18 is provided with a circular aperture 19 into which the bath 10 is fitted to provide an open area at the top of said bath 10. The front 14 of the housing 11 is provided with a control panel 21. Mounted on panel 21 is a thermostatic control 23 to permit selecting the temperature to be maintained in bath 10.

Referring to FIG. 3 there is illustrated the components required for the open flow system utilized with the immersion bath 10. The immersion bath 10 comprises an outer container or cylinder 25 with an open top 26 and closed bottom 28 and a port 27 in the bottom 28. Mounted within cylinder 25 is a second cylinder 29 provided as a test tank. This cylinder 29 is somewhat shorter in height than cylinder 25 and the bottom of said cylinder 29 is sealed or welded to the bottom 28 of cylinder 25 so that when fluid enters through port 27, the fluid flows through a distribution plate 65 and the fluid must pass through cylinder 29 spilling over the top of cylinder 29 into the surrounding area between cylinder 29 and the interior of cylinder 25. To permit the flow of such fluid, an outlet port 30 is provided at the bottom of cylinder 25. Also mounted in the area between the exterior of cylinder 29 and the interior of cylinder 25 is a refrigerant coil 32 having an insulated inlet 33 and an insulated outlet 34; it is to be noted that the refrigerant coil does not contact cylinder 29. The inlet 33 extends through the bottom 28 while the outlet 34 extends through cylinder 25. To complete the components for an open flow system, there is provided a motor driven fluid pump 35 that is utilized for circulation only and is provided with an inlet 36 adjacent outlet port 30 of the bath 10. An outlet port 37 of pump 35 is in turn connected by a pipe 38 to a manifold 39, the manifold 39 in turn being connected by a pipe 40 to the inlet port 27 of bath 10. An immersion heater 41 is mounted at one end of manifold 39 so that its immersion element 42 extends into manifold 39. An immersion temperature sensing element 45 is also mounted in manifold 39 preferably so that the immersion element 46 extends upward into pipe 40. The immersion temperature sensing element 45 is in turn electrically connected to a temperature monitor 48 that is in turn connected electrically to a source of power (not shown). Monitor 48 is also electrically connected to the heater 41. A drain pipe 50 is also connected to manifold 39 and drain pipe 50 is provided with a valve 51 to permit draining the complete system whenever desired. A fluid is poured into the bath 10 to fill the system described, that is, with pump 35 operating, the fluid within bath 10 will circulate from bath 10 out the outlet 30 into the inlet 36 of pump 35, out the outlet 37 through pipe 38 into manifold 39, from manifold 39 through pipe 40, through the inlet 27 of bath 10, through the distribution plate 65 and upward through cylinder 29 spilling over the upper open edge 31 of cylinder 29 into the area between cylinder 29 and interior of cylinder 25 to uniformly fill cylinder 25 to a specified level. Thus test tank 29 is surrounded by a tank 25 that functions as a reservoir for volume displacement of the fluid. In a further embodiment to minimize the effect of any heat leak in or out of the open flow system, there is provided a liquid envelope about all components. Referring to FIG. 3, in order to provide a liquid envelope 57 about all components, there is provided an outer housing 55 that completely surrounds tank 25, pump 35, pipe 38, manifold 39 and pipe 40, that is, housing 55 does not cover the top of tank 25 but is positioned in spaced relationship around the exterior wall of tank 25 and is positioned to enclose the impeller 56 of pump 35 and housing 55 is positioned in spaced relationship to enclose pipe 38, manifold 39 and pipe 40. Thus housing 55, when filled with a liquid, provides a complete liquid envelope 57 about the components of the open flow system. It is to be noted that the outlet port 30 of tank 25 empties into this liquid envelope or reservoir 57 for the liquid and the inlet port 36 of pump 35 is supplied by liquid from this liquid envelope or reservoir 57. Therefore the normal flow of the fluid in the open system will be from the reservoir 57 through the inlet 36 of pump 35 through pipe 38 through manifold 39, through pipe 40, through cylinder 29 spilling over into cylinder 25 and out the outlet 30 back to the reservoir 57. Thus the fluid will rise in reservoir 57 to the same level attained in cylinder 25 and the fluid or liquid of the reservoir 57 will be maintained at the same temperature as the fluid or liquid in tank 25 thus minimizing the effect of any heat leak in or out of the open flow system. Thus, with the double walled encasing of the bath, there will be less gradient in temperature between the top and bottom of the fluid in tank 25 than the gradient in temperature between the top and bottom of the liquid envelope 57. Any heat leak will necessarily be through casing 55. It is to be noted that refrigerant system pipes 34 and 33 are insulated and spaced from casing 55 and cylinder wall 25 so that they have no effect upon the liquid envelope through which they pass. A cover 25A shown in dotted lines in FIG. 3 may be used to cover the bath 10 when desired. The fluid covers the refrigerant coils mounted within cylinder 25 during operation. The fluid utilized in this open flow system may be, when a dry system, air of powder, when a wet system, a liquid or a liquid and aggregate. Any liquid may be utilized that is compatible with the materials of which the bath is constructed. For example, utilizing a fluid, such as silicone oil, will provide a wide range for testing or calibration and the fluid may be changed to be more compatible with the temperature range required. As the fluid spills over the edge 31, the vapor that may rise slightly will form a barrier between the air surrounding the open top and the fluid that is circulating. In the physical design of the system in which tank 29 is shorter than tank 25 and there is a spillage of controlled temperature fluid over the edge of tank 29, there is provided a fluid envelope around tank 29 to thus insure a minimum heat transfer from the fluid in tank 29. Due to the physical design of the system, there is a minimum mass or quantity of fluid utilized. The refrigerant system may be shut off and the circulation by the pump induced and the fluid heated to a desired temperature or by turning the refrigerant system on and setting the refrigerant system at a desired temperature which may be in a range to −100° F. and with the pump 35 operating, the liquid in the open flow system will continually circulate about the refrigerant coils 32 to thus reduce the temperature of the fluid in the system and circulate about heater 41 to maintain the desired temperature level. Thus by utilizing the temperature monitor 48, that is, selecting an exact temperature for the bath 10, the fluid circulating through manifold 39 will provide a response on sensing element 46 which is monitored through 48 to energize heater 41. As soon as the fluid drops below the predetermined temperature, it will immediately energize heater 41 until the fluid in manifold 39 has reached the desired temperature. Thus with constant circulation, an exact temperature in manifold 39 and pipe 40 will be maintained. Since there is little or no heat loss through cylinder 29, the temperature within cylinder 29 which is the main immersion bath for testing and calibrating, will be maintained within a very close setting. For any setting the gradient in temperature is minimum between the top edge 31 and the bottom 28. The fluid in the system may be maintained at an exact temperature by a capacity modulated temperature control system. It is to be noted that with the open flow system operating, the fluid spilling over the edge 31 of cylinder 29 develops an umbrella like formation and the vapor from the fluid develops a pressure above the fluid due to the flow which forms a vapor barrier between the fluid and the air above the open top of bath 10. With an immersion bath 29 as provided and described, any thermal responsive instrument, device or material, such as a thermometer, valve, etc., of any size to fit the bath, and at any temperature, may be immersed in bath 29 for testing or for calibration and the fluid level will not be changed.

A further embodiment of this device is illustrated in FIG. 4 in which a plurality of baths 10 may be provided and in which each bath 10 is connected to a single open flow system, that is, each bath 10 may be connected by a pipe 60 to a manifold 61 in which a refrigerant coil 32 is mounted and manifold 61 is in turn connected to a pump 35, pump 35 in turn being connected to manifold 39 and manifold 39 being connected by a pipe 40 to each of the baths 10. Manifold 39 is provided with a heater 41 and an immersion sensing element 45 is provided in the pipe 40 to control the temperature monitor 48. Thus a plurality of baths 10 may be provided with a single operating system to provide an open flow of an exact temperature fluid in each and all immersion baths connected thereto.

Referring to FIG. 3 a distribution plate may be inserted in tank 29 at or adjacent to port 27. The plate 65 preferably spans the interior area of tank 29 as illustrated and plate 65 may be permanently affixed to cylinder 29 or it may be threadably inserted for attachment within cylinder 29 so that the plate may be removed and a similar or different plate inserted as the need may be. The plate 65 is provided with a plurality of apertures 66 equally distributed about plate 65 so that the flow of fluid from inlet port 27 will produce an equal distribution of the fluid flow upward through tank 29 to prevent any gradient in temperature between the center of the cylinder like tank 29 and its exterior wall. Referring to FIG. 4 in which there are a plurality of baths and in which each tank 29 is provided with a distribution plate 65, the distribution plate 65 may be identical in each tank 29 and there will be an identical flow through each tank 29. However by changing the apertures in plate 65, that is, providing one tank 29 with a plate 65 having a plurality of large apertures while providing a second plate 65 in a second tank 29 with a plurality of small apertures, there will be a greater flow of the fluid from the system through the first distribution plate 65 and tank 29 than there will be through the second plate 65 and tank 29. Thus the distribution plate permits varying the flow through any one or all of a plurality of baths connected to a single system. This variation in flow may even be extended from a full open maximum flow to a completely closed plate, that is, one bath may be provided with a maximum aperture flow for even distribution in one bath while a second plate may be inserted in another bath to completely stop the flow through that bath.

Although we have illustrated the physical design of bath 10 as circular, the container or tank may be square, rectangular or any variation in shape as long as it is of an elongated form in which the central container 29 is shorter than the outer container 25 without departing from the spirit of this invention and although we have positioned the outlet of the bath at its lowest point, the outlet may be changed in its relationship to the liquid envelope or reservoir surrounding all components without departing from the spirit of this invention and this invention shall be limited only by the appended claims.

What is claimed is:

1. A constant temperature bath for testing and calibration of thermal responsive instruments which includes a double walled open top tank like reservoir forming an inner bath and outer expansion chamber for a fluid in which the inner bath of said double walled tank is shorter than the outer expansion chamber, an open flow system for said fluid connected by an inlet to the bottom of said inner bath of said double walled tank and connected by an outlet to said outer expansion chamber in which the fluid flow in the open system spills over the top of said inner bath to form an umbrella shaped flow into and against the walls of said outer expansion chamber, said open flow system including a pump to circulate the fluid through said system said pump being of sufficient capacity to maintain a constant flow to produce said umbrella shaped flow, a refrigerant coil to reduce the temperature of the fluid in said system to a predetermined temperature, an immersion heater to raise the temperature of the fluid in said system when it drops below a predetermined temperature and an immersion temperature sensing element and a monitor to control the operation of the heater in maintaining a constant predetermined temperature in said bath.

2. In a device according to claim 1 in which the umbrella shaped flow forms a resistive barrier to the absorption of condensation of moisture from the air to maintain a frost and ice free system and promotes the entrapment of the system fluid vapors.

3. In a device according to cliam 1 in which the configuration relationship of said double wall tank and the fluid flow maintains a minimum temperature gradient in said fluid between the top and bottom of said inner bath to maintain a minimum temperature loss in said bath.

4. In a device according to claim 1 in which said double walled open top tank reservoir and the components of said open flow system are surrounded by a fluid envelope to maintain a minimum temperature loss and gradient in said bath.

5. In a device according to claim 1 in which there are more than one open top tank like reservoir to provide a plurality of baths interconnected to a single open flow system.

6. In a device according to claim 1 in which there are more than one open top tank like reservoir to provide a plurality of baths interconnected to a single open flow system and in which there is provided a distribution plate adjacent the inlet port of each bath, and in which the apertures in said distribution plates may be varied to vary the fluid flow in one bath from that in another bath.

References Cited

UNITED STATES PATENTS 3,263,740   8/1966   Bruce _____ 165—108 X
3,177,699   4/1965   Lindquist et al. _____ 73—3

OTHER REFERENCES

Grace et al., Journal of Scientific Instruments, vol. 20, No. 4 April 1943, pages 60–63; copy in Scientific Library Q 184 J7.

LOUIS R. PRINCE, *Primary Examiner.*

S. CLEMENT SWISHER, *Examiner.*